United States Patent
Rijckaert et al.

(10) Patent No.: US 6,192,185 B1
(45) Date of Patent: Feb. 20, 2001

(54) RECORDING AND REPRODUCTION OF AN INFORMATION SIGNAL IN A SHORT PLAY AND A LONG PLAY MODE

(75) Inventors: Albert M. A. Rijckaert; Marinus A. H. Looykens, both of Eindhoven (NL)

(73) Assignee: U.S. Philips Corporation, New York, NY (US)

(*) Notice: Under 35 U.S.C. 154(b), the term of this patent shall be extended for 0 days.

(21) Appl. No.: 09/203,697

(22) Filed: Dec. 2, 1998

(30) Foreign Application Priority Data

Dec. 8, 1997 (EP) .................................................. 97203866

(51) Int. Cl.$^7$ .................................................. H04N 5/782
(52) U.S. Cl. .............................................. 386/67; 386/79
(58) Field of Search .................................. 386/46, 67, 68, 386/79, 80, 74; 360/32, 48; H04N 5/782

(56) References Cited

U.S. PATENT DOCUMENTS

| | | | |
|---|---|---|---|
| 5,335,116 | * 8/1994 | Onishi et al. | 386/67 |
| 5,412,515 | 5/1995 | Rijckaert et al. | 360/48 |
| 5,495,369 | 2/1996 | Rijckaert et al. | 360/48 |
| 5,594,596 | * 1/1997 | Kawakami et al. | 386/67 |

FOREIGN PATENT DOCUMENTS

96/13831 * 5/1996 (WO).

* cited by examiner

Primary Examiner—Huy Nguyen
(74) Attorney, Agent, or Firm—Edward W. Goodman (57) ABSTRACT

An apparatus for recording an information signal forming slant tracks ($T_i$) on a magnetic record carrier (16), and for recording a control (CTL) signal forming a longitudinal CTL track (50). At least one write head (10) located on a rotatable head drum (14) writes the information signal on the record carrier to produce the slant tracks, while a CTL write head (34) writes the CTL signal at a specific frequency on the record carrier. In a first recording mode, a portion of the information signal is recorded by the write head (10) to produce a track during each revolution of the head drum on the record carrier, the frequency of the CTL signal being such that an edge in the CTL signal is written in the CTL track for each of the tracks, and the record carrier (16) being transported with a predetermined first speed, and the head drum (14) being rotated with a predetermined rotational velocity. In a second recording mode, the information signal produces a track of information during each n-th revolution of the head drum (14), while the record carrier is transported at a second speed substantially equal to the first speed divided by n, in the second recording mode, and the head drum is rotated at the same predetermined rotational velocity.

4 Claims, 9 Drawing Sheets

RECORDING AND REPRODUCTION OF AN INFORMATION SIGNAL IN A SHORT PLAY AND A LONG PLAY MODE

BACKGROUND OF THE INVENTION

1. Field of the Invention

The invention relates to an apparatus for recording an information signal, such as a digital video signal, so as to produce slant tracks on a magnetic record carrier, and for recording a control (CTL) signal so as to produce a longitudinal CTL track on said record carrier, the apparatus comprising:

input means for receiving the information signal, first writing means comprising a plurality of at least a first and a second write heads located on a rotatable head drum, for writing the information signal on said record carrier so as to produce slant tracks on the record carrier, the first and second write head having a gap with a first azimuth angle and a second azimuth angle, respectively, generator means for generating a CTL signal with a specific frequency, and second writing means having a CTL write head for writing the CTL signal on said record carrier so as to produce said longitudinal track, wherein, in a first recording mode, the first writing means is adapted to write, by said at least first and second write head and during each revolution of the head drum, a portion of the information signal so as to produce tracks of information during each revolution of said head drum on said record carrier, said specific frequency of said CTL signal being such that the second writing means is adapted to write one edge of a first type in said CTL signal in said CTL track during each revolution of said head drum, the apparatus further comprising:

transport means for transporting the record carrier with a predetermined first speed in said first recording mode, and drive means for rotating said head drum with a predetermined rotational velocity in said first recording mode.

The invention also relates to an apparatus for reproducing said information signal, recorded in either said first or a second recording mode, as well as to a recording method and to a record carrier.

2. Description of the Related Art

A recording apparatus as defined in the opening paragraph is well known in the art as a helical scan video recorded. Reference is made in this respect to European Patent Application EP-A 346,973, corresponding to U.S. Pat. Nos. 5,412, 515 and 5,495,369. The first recording mode can be considered as a recording mode at a nominal record carrier speed. A corresponding reproduction apparatus will be capable of reproducing the information recorded by the known recording apparatus in a first reproduction mode, at the same nominal record carrier speed.

SUMMARY OF THE INVENTION

The invention aims at providing a recording apparatus which enables the first recording mode defined above, as well as a long play recording mode, that is: a recording mode in which the record carrier speed is lower than the nominal record carrier speed defined above. Further, the invention aims at providing a reproduction apparatus which enables the first reproduction mode defined above, as well as a long play reproduction mode, that is: a reproduction mode in which the record carrier speed is the same as the record carrier speed in the second recording mode.

The recording apparatus in accordance with the invention is characterized in that in a second recording mode, the first writing means is adapted to write, by said first write head during each n-th revolution of the head drum, a portion of said information signal so as to produce slant tracks of information during said each n-th revolution of said head drum on said record carrier, the transport means being adapted to transport the record carrier with a second speed which substantially equals the first speed divided by n, in said second recording mode, the drive means being adapted to rotate said head drum with substantially said same predetermined rotational velocity in said second recording mode, the generator means being further adapted to generate said CTL signal with said same predetermined frequency in said second recording mode, and the second writing means being further adapted to write the CTL signal of said predetermined frequency so as to produce said longitudinal track in said second recording mode, and that n is an integer larger than 1.

The reproduction apparatus in accordance with the invention is characterized in that in said second reproduction mode, the first reading means is adapted to read, by said first read head, during each n-th revolution of the head drum, a portion of said recorded information from a track on said record carrier, the transport means being adapted to transport the record carrier with a second speed which substantially equals the first speed divided by n, in said second reproduction mode, and that n is an integer larger than 1, the drive means being adapted to rotate said head drum with said same predetermined rotational velocity in said second reproduction mode, the apparatus further being provided with detection means for detecting, in said second reproduction mode, the signal level of the recorded information read by said first read head during each revolution of the head drum, for determining that one revolution in each group of n revolutions of the head drum that leads to the highest signal level of the recorded information read the first read head and generating a control signal in response thereto, the signal processing means being adapted to process the recorded information read by said first read head during that one revolution of each group of n revolutions indicated by said control signal.

The invention is based on the recognition to use a CTL signal with a frequency that is the same for both recording modes. This has the advantage that in both modes the signal electronics can function in the same frequency range. This feature, however, results in too many CTL edges recorded in the CTL track for a proper reproduction in the second reproduction mode. This is overcome by detecting the envelope amplitude of the signal reproduced in the second reproduction mode and by shifting the processing cycle during reproduction in time, such that those bursts of information read from the record carrier having the highest amplitude are used for processing so as to obtain a replica of the information signal originally recorded.

It should be noted that International Patent Application WO 96/13831, corresponding to U.S. patent application Ser. No. 08/977,259, filed Nov. 24, 1997, discloses an analog video recorder capable of recording an analog video signal in either a first or a second recording mode. The first recording mode is the well-known recording mode in which the record carrier is transported with the nominal recording speed, and the second recording mode is a recording mode with a reduced record carrier speed. During the second recording mode, both heads function in the same way as in the first recording mode. Further, the document discloses a digital video recorder provided with four write heads for writing the digital video information. Only a recording mode is described in which the record carrier speed is slightly higher than the nominal record carrier speed defined above. The digital video recorder produces a record carrier having subsequent groups of four tracks recorded on it by the four heads and having different azimuths. Three rising edges in the CTL signal each time correspond to a group of four tracks.

BRIEF DESCRIPTION OF THE DRAWINGS

These and other aspects of the invention will be apparent from and elucidated further with reference to the embodiments in the following figure description, in which.

DESCRIPTION OF THE PREFERRED EMBODIMENTS

Figure 1:
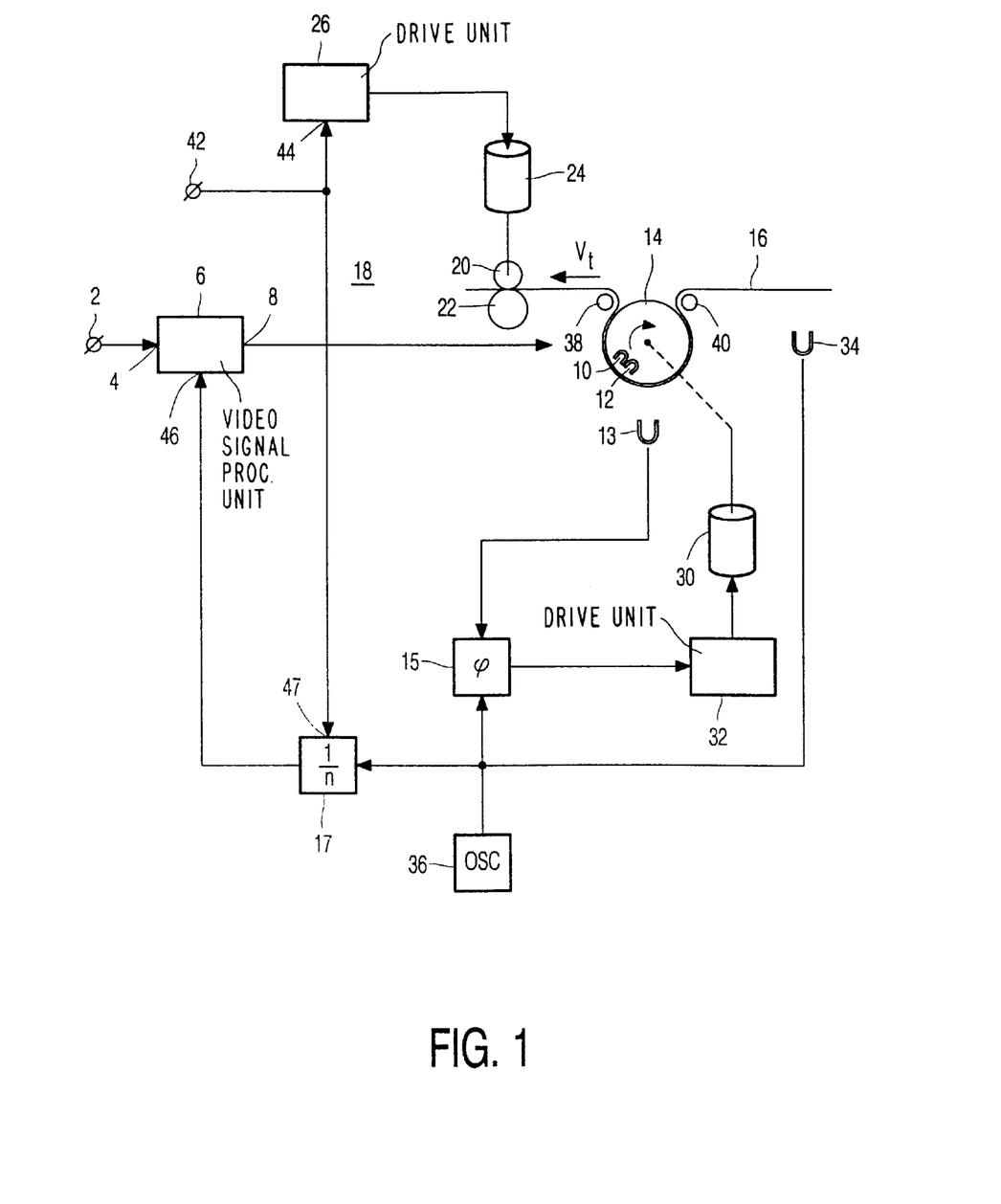
FIG. 1 shows a first embodiment of the recording apparatus.

FIG. 1 shows, schematically, a first embodiment of the recording apparatus of the invention. The recording apparatus has an input terminal 2 for receiving an information signal which is in the form of a digital video signal. The input terminal 2 is coupled to an input 4 of a video signal processing unit 6, well known in the art, that carries out a video signal processing on the video signal so as to enable the recording of the video signal on a magnetic record carrier 16. An output 8 of the video signal processing unit 6 is coupled to a head pair, comprising write heads 10 and 12 that are located side by side on a rotating head drum 14, for recording the video signal on the record carrier 16 so as to obtain slant tracks of recorded video information on said record carrier 16. A record carrier transport unit 18 is provided for transporting the record carrier 16 with a specific speed $v_t$ in a direction indicated by the arrow in FIG. 1. The transport unit 18 comprises a capstan 20 and a pressure roller 22, between which the record carrier is pressed. A capstan motor 24 rotates the capstan 20 with a specific rotational velocity that leads to the record carrier velocity $v_t$. To that purpose, the capstan motor 24 is driven by a drive unit 26.

The apparatus further comprises a head drum motor 30 for rotating the head drum 14 with a specific rotational velocity. To that purpose, the head drum motor 30 is driven by a drive unit 32. Further, a control (CTL) head 34 is provided for recording a CTL signal on the record carrier so as to obtain a longitudinal CTL track on said record carrier 16. To that purpose, an oscillator 36 is provided for generating a square-wave signal having a specific frequency $f_1$, which is supplied to the write head 34. The frequency $f_1$ equals the rotational frequency of the head drum 14 and has a value of 25 or 30 Hz. A detector unit 13 is provided for generating a detection signal, or detection pulse, during each revolution of the head drum 14. Both the detection signal and the CTL signal are applied to a phase comparator 15, which has an output coupled to an input of the drive unit 32. The drum rotational velocity of the head drum 14 is controlled in response to the output signal of the phase comparator 15. The output of the oscillator 36 is further coupled, via a 1/n divider unit 17, to a control input 46 of the video signal processing unit 6. The path of the record carrier 16, as it is transported along the rotating head drum 14, is in an omega wrap, via the tape guides 38 and 40. The apparatus further comprises a control signal input 42 for receiving a control signal for switching the recording apparatus into a first or a second recording mode. The control signal input 42 is coupled to control inputs 44 and 47 of the drive unit 26 and the 1/n divider unit 17, respectively.

Figure 2:
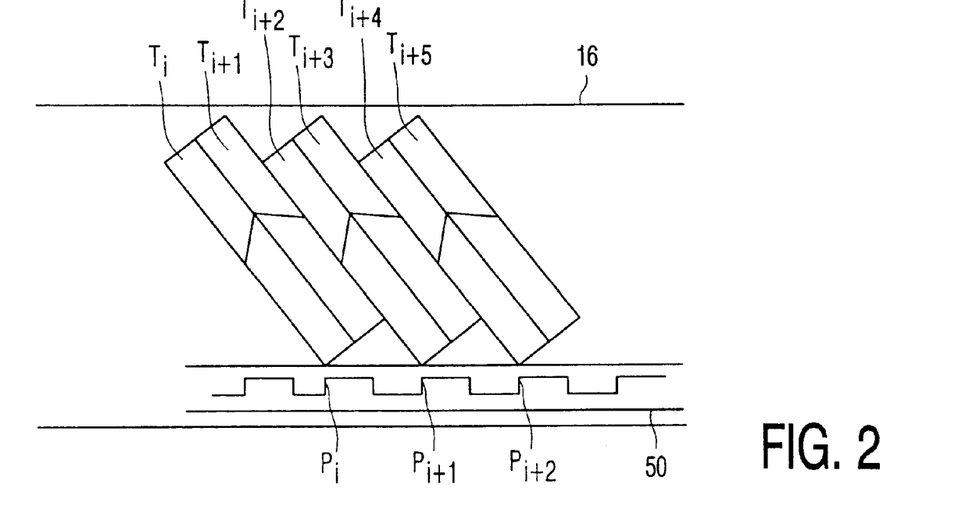
FIG. 2 shows the track pattern on a record carrier obtained by means of the recording apparatus of FIG. 1, when switched into the first recording mode.

FIG. 2 shows the record carrier 16 having slants tracks $T_i$, $T_{i+1}$, $T_{i+2}$, ... of video information recorded on it in a first recording mode by the recording apparatus of FIG. 1. The tracks, $T_i$, $T_{i+2}$, $T_{i+4}$, ... have been recorded by the head 10, which has a head gap of a first azimuth angle, as indicated in FIG. 2. The tracks $T_{i+1}$, $T_{i+3}$, ... have been recorded by the head 12, which has a gap of a second azimuth. During one-half of the time interval of each revolution of the head drum 14, the head pair 10,12 records a track pair, such as the tracks $T_i, T_{i+1}$. A CTL track 50 is present which runs in the longitudinal direction of the record carrier 16. The frequency with which the CTL signal is generated by the oscillator 36 is such that, with the speed of the record carrier being $v_t$, during each revolution of the head drum, one period of CTL signal is recorded by the head 34 in the track 50. This results in the track pattern as shown in FIG. 2. As can be seen in FIG. 2, rising edges $p_i$, $p_{i+1}$, $p_{i+2}$, ... in the CTL signal are shown that have a correspondence with the tracks $T_i$, $T_{i+2}$, $T_{i+4}$, ....

Under the influence of the control signal supplied via the input 42, the 1/n divider unit passes the CTL signal more or less uninfluenced, in the sense that, in the situation where the CTL signal has a duty cycle of 50%, the processing unit 6 supplies portions of information of the video signal to each of the heads 10, 12 and only during the 'high' half cycles (as an example) in the CTL signals.

Figure 3:
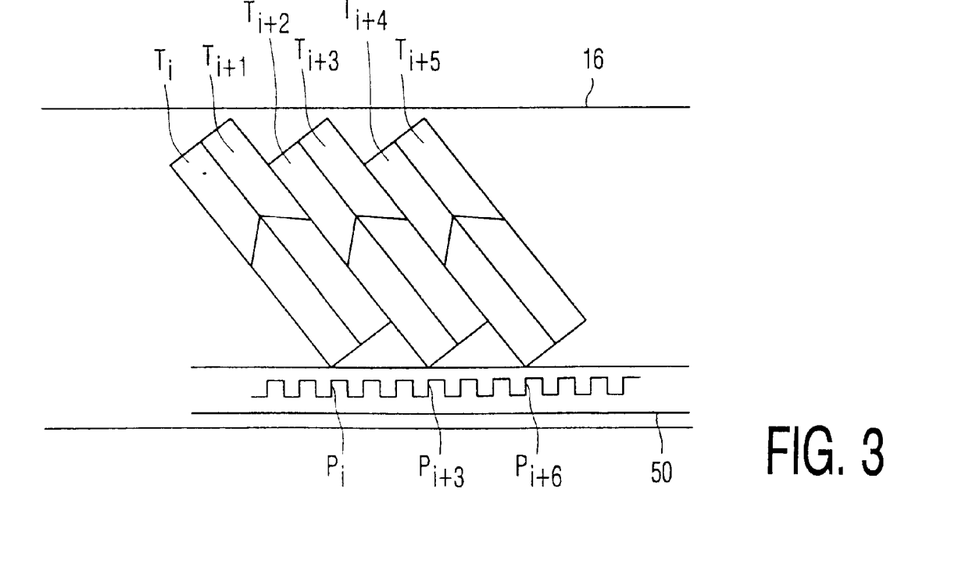
FIG. 3 shows the track pattern on a record carrier obtained by means of the recording apparatus of FIG. 1, when switched into the second recording mode.

In a second recording mode, also called a 'long play burst mode', during each n-th (e.g., in the present example, during each third) revolution of the head drum 14, a portion of said video signal is recorded by the head pair 10,12 on the record carrier 16. In this second recording mode, the record carrier transport speed is $v_t/n$ (or: $v_t/3$ in the example given). It is an essential feature of the invention to keep the oscillation frequency of the oscillator 36 the same as in the first recording mode. In the second recording mode, bursts of video information are generated during each n-th revolution of the head drum, for recording by the heads 10,12 in a track pair, such as the track pair $T_i,T_{i+1}$. As a result, the track pattern as shown in FIG. 3 is obtained. The track pattern of FIG. 3 differs from the track pattern of FIG. 2 only in the CTL track 42, which has a CTL signal having a period which is 1/n (or one-third in the present example) of the period of the CTL signal in the first recording mode. This results in (n−1=) two rising edges in between the rising edges $p_i$ and $p_{i+3}$, that correspond to the tracks $T_i$ and $T_{i+2}$, respectively. The second recording mode is a recording mode with an n times lower recording bit-rate, compared to the first recording mode, and thus an n times longer recording time.

Under the influence of the control signal supplied via the input 42, the 1/n divider unit now passes only one of three subsequent positive half cycles (in the above example given) of the CTL signal supplied by the oscillator 36 to the control signal input 46 of the processing unit 6. As a result, the processing unit 6 now supplies portions of information of the video signal to each of the heads 10, 12 and only during one of three positive half cycles in the CTL signal, resulting in the recording of a track pair by the heads only once per three revolutions of the head drum 14.

Figure 4A:
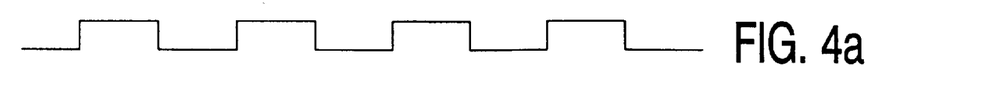
FIG. 4a shows an example of the CTL signal generated.
Figure 4B:
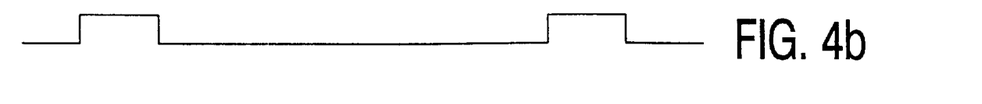
FIG. 4b shows the corresponding output signal of the divider unit in the apparatus of FIG. 1.

FIG. 4a shows the CTL signal as supplied by the generator 36 to the divider unit 17. In the first recording mode, the output signal of the divider unit 17 equals the CTL signal in FIG. 4(a). Under the influence of this signal supplied to the control input 46, the processing unit 6 is controlled in such a way that, in response to the positive half-wave portions in the signal, the processing unit 6 supplies bursts of information during each revolution of the head drum to the heads 10 and 12 for recording the information in a track pair. In the second recording mode, the output signal of the divider unit 17 is shown in FIG. 4(b). Thus, a signal comprising one out of three positive half-wave portions of the CTL signal is supplied to the control input 46 of the processing unit 17. Under the influence of this signal supplied to the control input 46, the processing unit 6 is controlled in such a way that, in response to the positive half-wave portions in the signal, the processing unit supplies bursts of information during each third revolution of the head drum 14 to the heads 10 and 12 for recording the information in a track pair.

Figure 5:
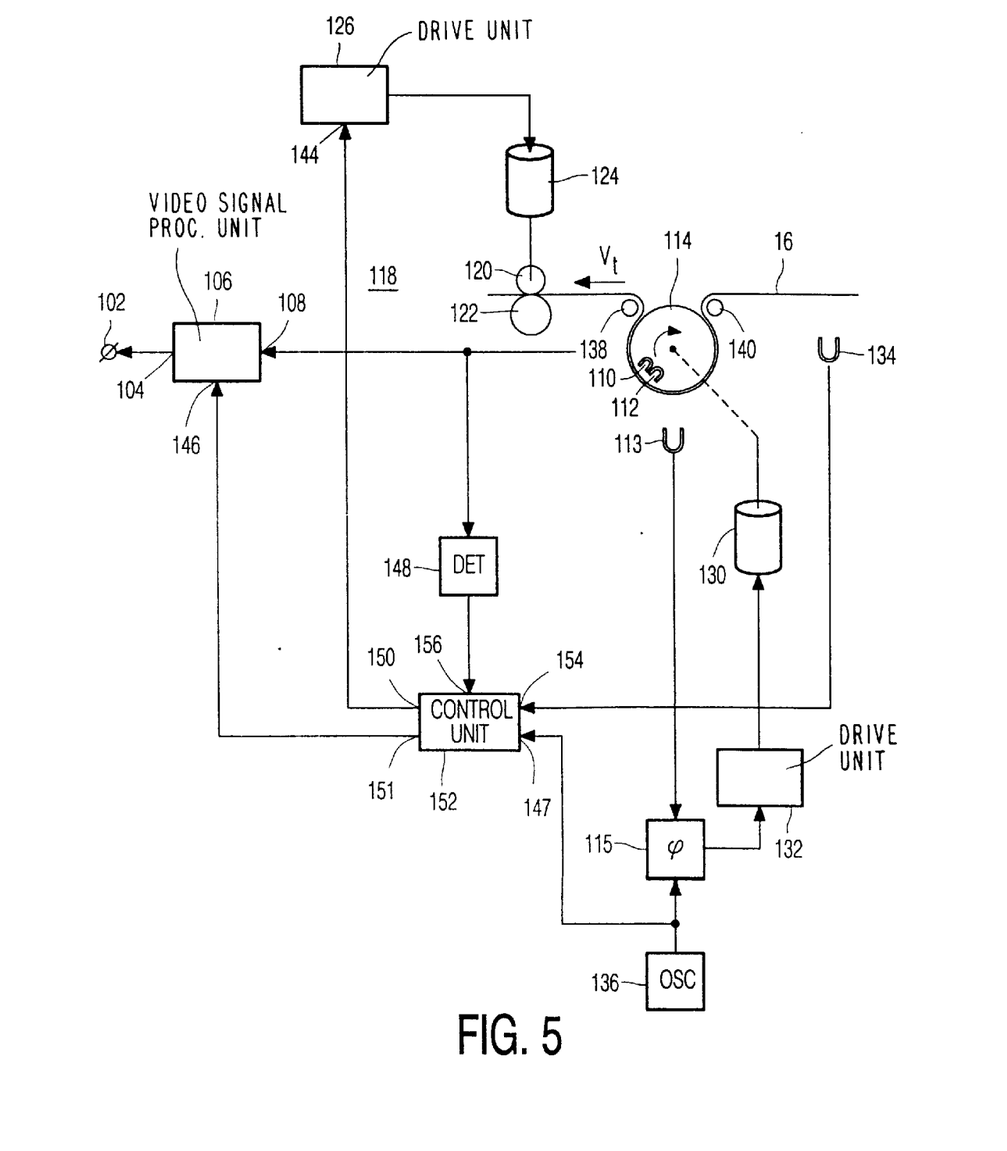
FIG. 5 shows a first embodiment of a reproduction apparatus.

FIG. 5 shows a reproduction apparatus for reproducing the video signal, recorded by the apparatus of FIG. 1 in either the first or the second recording mode, from said record carrier 16. The apparatus is provided with a rotating head drum 114 on which a head pair 110,112 is located. A head drum motor 130 is provided for rotating the head drum with a predetermined rotational velocity which is the same as the rotational velocity of the head drum 14 in the recording apparatus. A drive unit 132 is provided for driving the motor 130. The record carrier is transported in a direction shown by the arrow in FIG. 5, by means of a capstan 120 and a pressure roller 122. The capstan 120 is rotated by means of a capstan motor 124 driven by a drive unit 126. In a first reproduction mode, the capstan is rotated by the capstan motor, such that the record carrier 16 is transported with a velocity $v_t$ which is the same as the velocity of the record carrier in the first recording mode. In a second reproduction mode, the capstan is rotated by the capstan motor such that the record carrier 16 is transported with a velocity $v_t/n$, which is the same as the velocity of the record carrier in the second recording mode.

The read heads 110,112 are coupled to an input 108 of a video signal processing unit 106. Further, at least one, but preferably both of the heads are coupled to an input of a detector unit 148. A CTL read head 134 is provided for reading the CTL signal from the CTL track 50. An output of the CTL read head 134 is coupled to an input 154 of a control unit 152. Also an output of the detector unit 148 is coupled to an input 156 of the control unit 152. An output 150 of the control unit 152 is coupled to control inputs 144 and 146 of the drive unit 126 and the processing unit 106, respectively. An oscillator unit 136 is provided for generating a reference signal of frequency of 25 or 30 Hz, in the same way as the oscillator 36 in the recording apparatus. Further, a detector 113 is provided for generating a detection signal, such as a detection pulse for each revolution of the head drum 114. The oscillator unit 136 and the detector 113 have outputs coupled to a phase comparator 115, which generates an output signal in response to the signals generated by the oscillator 136 and the detector 113 and supplies the output signal as a drive signal to control unit 132 for controlling the head drum motor 130 to rotate the head drum 114 with the predetermined rotational velocity.

Reproduction is realized in the following way. The control unit 152 controls the drive unit 126 in such a way that the record carrier is transported with a specific velocity. Let us assume that this is the velocity $v_t$. The CTL read head 134 reads the CTL signal from the CTL track, resulting in CTL pulses which are supplied to the control unit 152. It should be noted here, that the record carrier that should be reproduced is the record carrier of FIG. 2 or the record carrier of FIG. 3. The control unit 152 detects the frequency of the CTL pulses read by the CTL read head 134 and supplied to the input 154. If the record carrier is a record carrier as per FIG. 2, the control unit 152 will detect a frequency of the CTL pulses which equals the predetermined CTL frequency, so that the control unit 152 detects a record carrier which has been recorded in the first recording mode. As a result of this, the control unit 152 switches the reproducing apparatus into the first reproduction mode, by supplying a control signal, at its output 150, to the drive unit 126 so as to set the motor 124 to the correct speed, resulting in the tape speed $v_t$. Further, the control unit 152 generates a control signal, such as shown in FIG. 4a at its output 151, this control signal being supplied to the control signal input 146 of the processing unit 106. A tracking control system (not shown) in the reproduction apparatus, realizes a correct tracking of the head pairs relative to the track pairs, so that an optimal reproduction can be realized in the first reproduction mode. In this first reproduction mode, the record carrier is (remains) driven with the speed $v_t$ and the head pair reads video information from the subsequent track pairs $T_i,T_{i+1}$; $T_{i+2},T_{i+3}$; $T_{i+4},T_{i+5}$; . . . during each revolution of the head drum 114. Under the influence of the control signal shown in FIG. 4a, the processing unit 106 receives bursts of information during half the period of each revolution of the head drum 114 and processes the information received so as to obtain a replica of the digital video signal at its output 102.

Suppose that the record carrier is a record carrier as per FIG. 3. With the record carrier 16 being driven with the speed $v_r$, the control unit 152 detects a frequency of the CTL pulses supplied to its input 154 which is n (3, in the above example) times too high. The control unit 152 thus detects a record carrier which has been recorded in the second recording mode. In response to this detection, the control unit 152 switches the apparatus into the second reproduction mode, by supplying a control signal to the drive unit 126. In response to this control signal, the drive unit 126 switches over to a record carrier speed which is n (=3) times lower than the speed in the first reproduction mode. Further, the control unit 152 generates at its output 151 a control signal, as shown in FIG. 4b, which is supplied to the control input 146 of the processing unit 106. As a result, the processing unit 106 processes the burst of information read from the track pairs by the heads 110 and 112 during every third revolution of the head drum 114. The question is: which one revolution of, each time, three subsequent revolutions of the head drum is chosen.

Figure 6A:
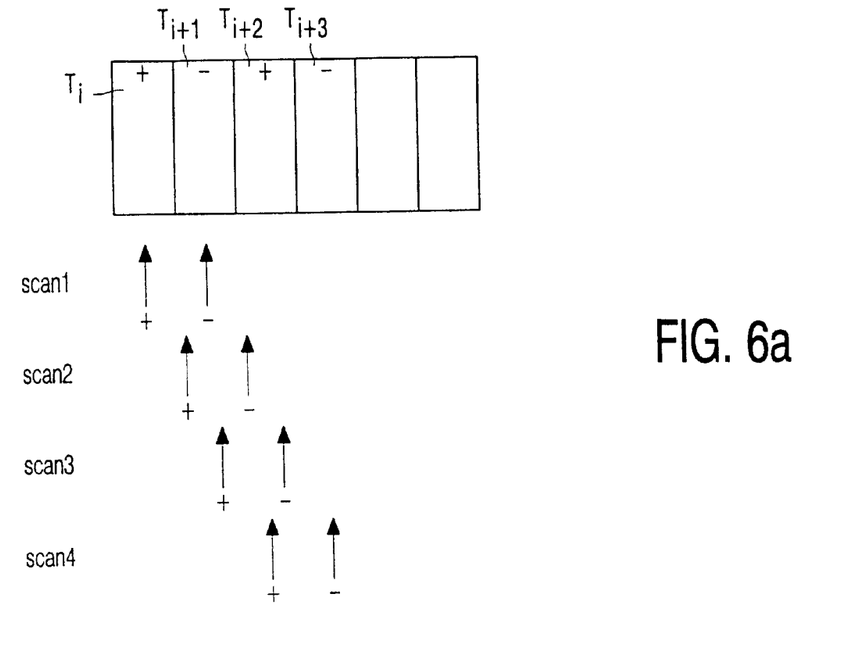
FIGS. 6a–6c show further explanations of the functioning of the apparatus of FIG. 5 in the second reproduction mode.
Figure 6B:
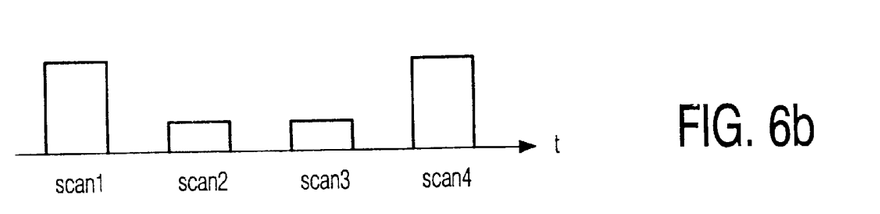
Figure 6C:
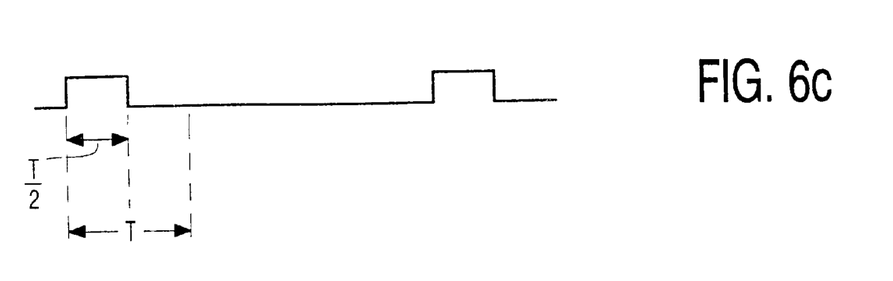

FIG. 6a shows, schematically, a number of tracks $T_i$, $T_{i+1}$, $T_{i+2}$, $T_{i+3}$, . . . on the record carrier. For simplicity reasons, the tracks are drawn in a vertical direction. Further, FIG. 6a shows the position of the head pair during three subsequent revolutions of the head drum, identified by 'scan 1', 'scan 2', 'scan 3' and 'scan 4'. It will be clear that each scan of a track pair by the head pair lasts a time interval equal to half the time interval of one revolution of the head drum. FIG. 6a shows that during scan 1, the head pair is positioned on the track pair $T_i$,$T_{i+1}$, that during scan 4, the head pair is positioned on the track pair $T_{i+2}$,$T_{i+3}$. During the scans 2 and 3, the head pair is not correctly positioned on a track pair. FIG. 6b shows the signal level of the output signal of one of the heads of the head pair, or the signal level of the sum of the output signals of both heads of the head pair, during the subsequent scans 1, 2, 3 and 4. The signal levels shown in FIG. 6b could be the output signal supplied by the detector unit 148. During the scans 1 and 4, the signal level is maximum, whereas during the scans 2 and 3, the signal level is lower. In response to the signal levels supplied by the detector unit 148 to the control unit 152, the control unit 152 generates the signal shown in FIG. 6c at its output 151. During half the time interval T of the scans 1 and 4, this time interval T being the time interval corresponding to one revolution of the head drum 114, the signal in FIG. 6c is 'high'. The processing unit 106 is enabled by this control signal, so that it processes the bursts of information read by the head pair 110,112, only during the scans 1 and 4 and ignore the bursts of information read by the head pair during the scans 2 and 3.

As said before, the detector 148 detects the signal level of the video signal read from the record carrier by one or both heads. This could be realized by envelope detection of the signal read by a head.

Figure 7:
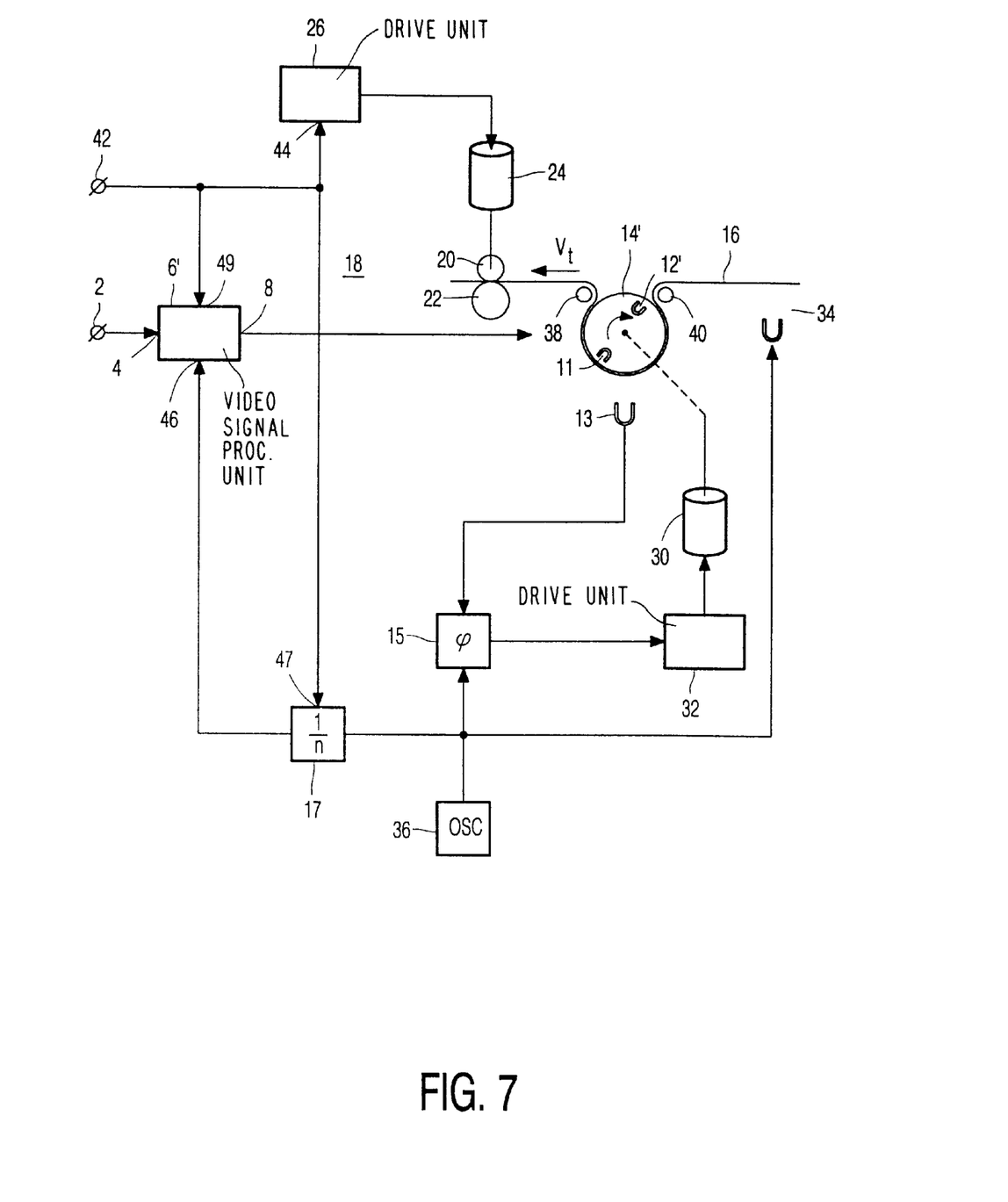
FIG. 7 shows a second embodiment of the recording apparatus.
Figure 10A:
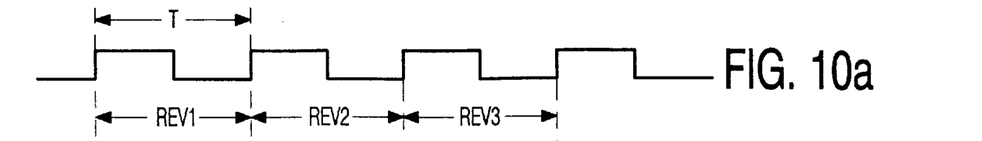
FIG. 10a shows the CTL signal generated.

FIG. 7 shows another embodiment of the recording apparatus. The recording apparatus of FIG. 7 shows a large resemblance with the apparatus of FIG. 1, with the exception that the head drum 14' now has two heads 10 and 12' located at 180 degrees around the circumference of the head drum 14'. The first recording mode is the well-known recording mode in which the two heads each record one track on the record carrier during one revolution of the head drum 14'. This leads to the track pattern of FIG. 8. It should be noted that the CTL track 50 in FIG. 8 does not differ from the CTL track in FIG. 2. FIG. 10a shows the output signal of the divider unit 17, which is supplied as a control signal to the input 46 of the video signal processing unit 6', which functions differently from the processing unit 6 in FIG. 1. In response to selecting the first recording mode, which is indicted to the processing unit 6' by means of the control signal applied via the input 49, the processing unit 6' supplies a portion of information to be recorded to its output 8 during one half of the time interval of a revolution of the head drum, denoted 'rev 1' in FIG. 10a, more specifically, during the 'high' period of the signal shown in FIG. 10a. This portion is recorded by head 10 so as to form one track on the record carrier. During the second half of the first revolution, that is in the 'low' period of the signal shown in FIG. 10a during revolution 1, the processing unit supplies a portion of information to be recorded to its output 8, for recording by the head 12'. This continues for subsequent revolutions of the head drum, resulting in the track pattern shown in FIG. 8.

In the second recording mode, the record carrier 16 is again transported with a speed $v_r/n$, where n is again assumed to be equal to 3. Recording is now realized in the following way. Reference is made to FIG. 9 that shows the recording pattern obtained by the apparatus of FIG. 7 in the second recording mode. FIG. 10b shows the control signal supplied to the input 46 of the processing unit 6' in the second recording mode. During a first rotation of the head drum 14', the head 10 records a track $T_i$ on the record carrier. During the second rotation of the head drum 14', the head 12 records a track $T_{i+1}$ on the record carrier. No track is written during the third rotation of the head drum 14'. During the fourth rotation, the head 10 records a track $T_{i+2}$ on the record carrier. In the fifth rotation, the head 12 records the track $T_{i+3}$. In the sixth rotation, no track is recorded. Thus: in cycles of three rotations of the head drum, the head 10 records a track in the first rotation and the head 12 records a track in the second rotation. The record carrier speed is again decreased by a factor of n (=3), so that the period of the CTL signal in the CTL track 50 is decreased by a factor of n, compared to the track pattern of FIG. 8.

Figure 8:
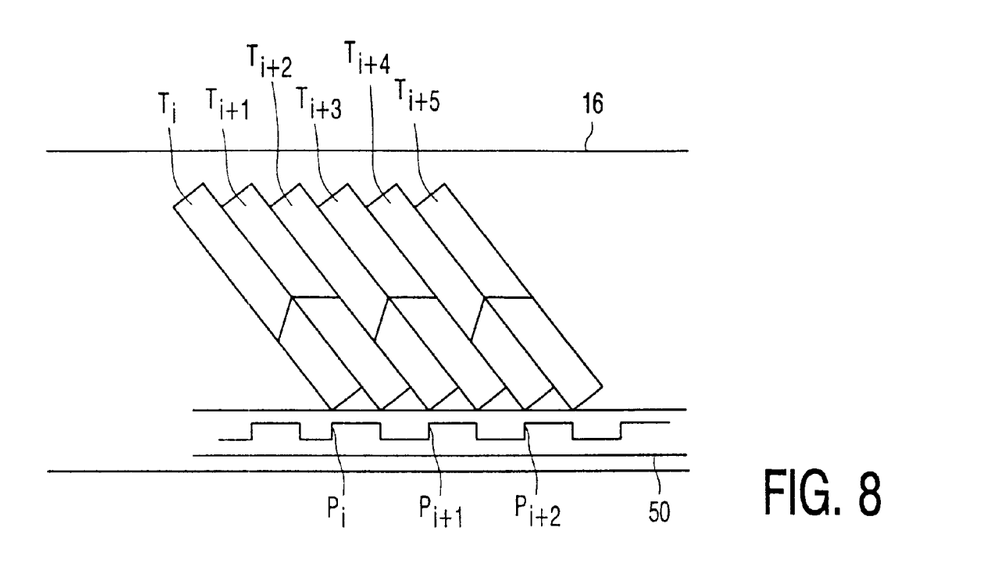
FIG. 8 shows the track pattern on a record carrier obtained by means of the recording apparatus of FIG. 7, when switched into the first recording mode.
Figure 9:
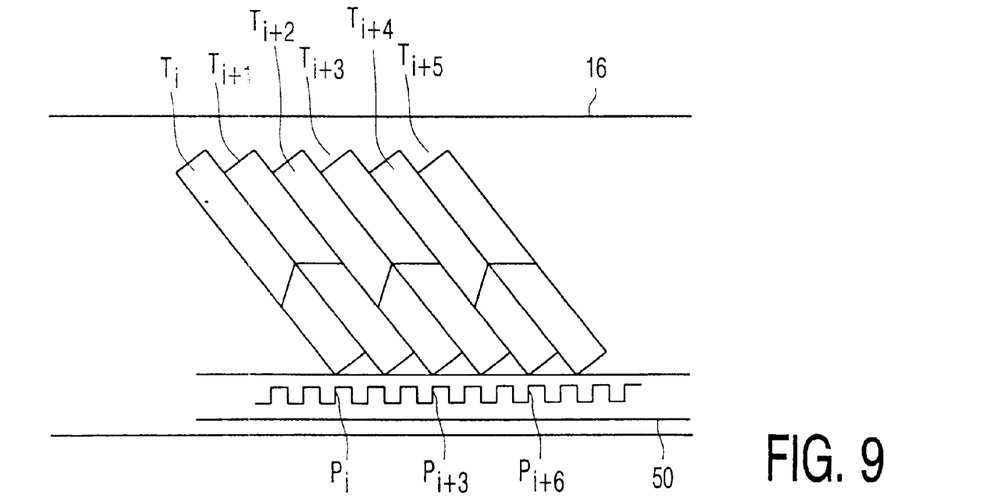
FIG. 9 shows the track pattern on a record carrier obtained by means of the recording apparatus of FIG. 7, when switched into the second recording mode.
Figure 10B:
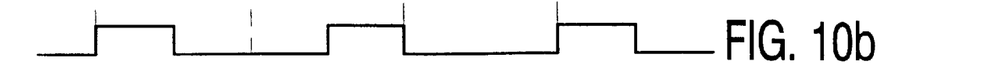
FIG. 10b shows the corresponding output signal of the divider unit 17 in the apparatus of FIG. 7.
Figure 11:
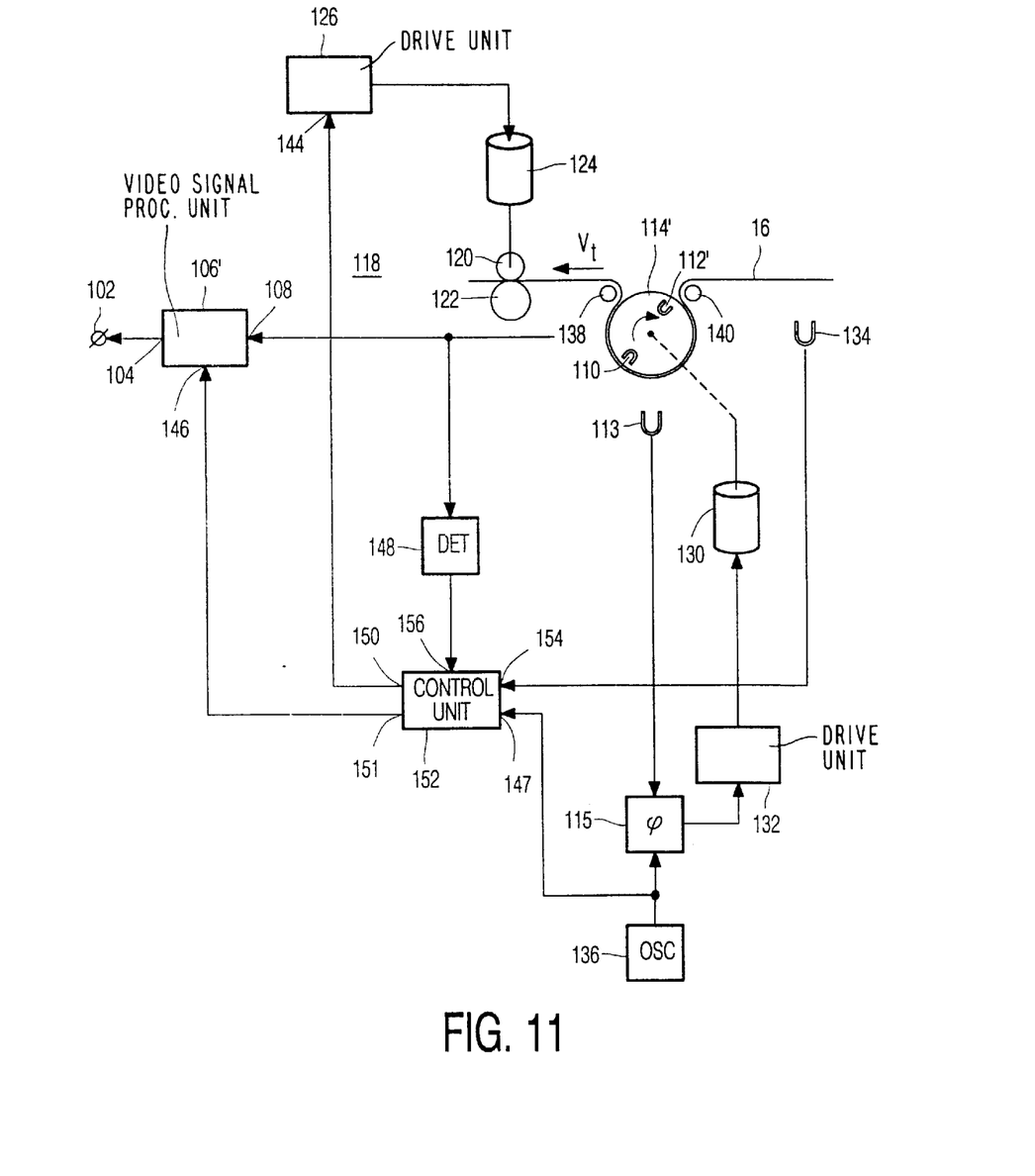
FIG. 11 shows a second embodiment of a reproduction apparatus.
Figure 12A:
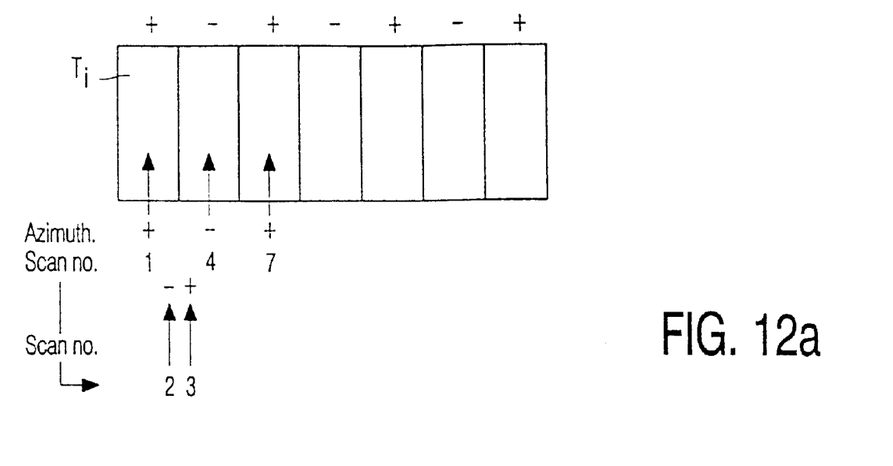
FIGS. 12a and 12b show the functioning of the reproduction apparatus of FIG. 11 in the second reproduction mode.

FIG. 11 shows a reproduction apparatus for reproducing the video signal recorded on the record carriers shown in FIGS. 8 and 9. The reproduction apparatus shows a large resemblance with the reproduction apparatus of FIG. 5, with the difference that the heads 110 and 112' are located at 180° around the circumference of the head drum 114'. The first reproduction mode, for reproducing the video signal recorded on the record carrier as shown in FIG. 8, is the well-known reproduction mode of a helical scan video signal reproduction apparatus and requires no further explanation. In the second reproduction mode, the record carrier is transported with a speed $v_r/n$. The functioning of the apparatus of FIG. 11 in the second recording mode will be further explained with reference to FIGS. 12a and 12b. For simplicity reasons, FIG. 12a shows the tracks in a vertical direction.

During reproduction in the second reproduction mode, both heads read the information recorded in the tracks on the record carrier 16. During the first half of a first revolution of the head drum, one of the heads, let us assume the head 110 having a first azimuth angle indicated by the + sign, reads the information recorded in the track $T_i$. This is the first scan. The result is a reproduced signal of relatively large amplitude, see FIG. 12b. During the second half of the first revolution of the head drum, the other head, that is, in the present example, the head 112', scans the record carrier 16. This is called the second scan. It should be noted that, during the second scan when the head 112' scans the record carrier, the head 112' is partly located on the track $T_i$ and partly on the track $T_{i+1}$. As a result, only a low level reproduced output signal will be generated by the head 12', see FIG. 12b. During the first half of the second revolution of the head drum, the head 110 having the first azimuth angle again scans the record carrier. This is the third scan. It should be noted that, during the third scan when the head 110 scans the record carrier, the head 110 is partly located on the track $T_i$ and partly on the track $T_{i+1}$. As a result, only a low level reproduced output signal will be generated by the head 110, see FIG. 12b. During the second half of a second revolution of the head drum, the head 112' again scans the record carrier. During this scan, which is called the fourth scan, the head 112' is positioned on the track $T_{i+2}$. The result is a reproduced signal of relatively large amplitude, see FIG. 12b.

Figure 12B:
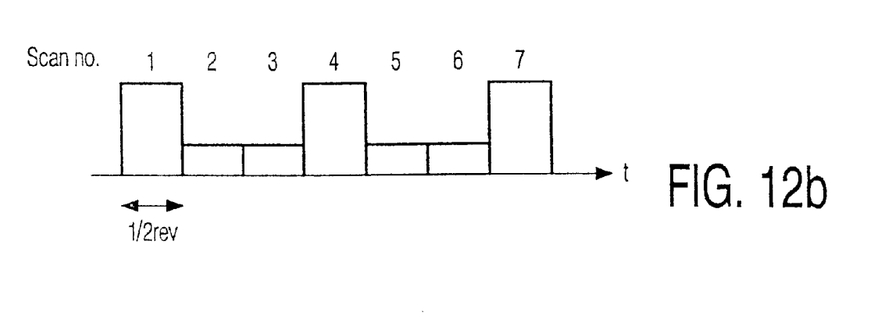

The signal shown in FIG. 12b is supplied by the detector unit 148 to the control unit 152. In response to this signal, the control unit 152 generates a control signal at its output 151, this control signal enabling the processing unit 106' to process the signal read by the head 110 during the first halves of the first, fourth, seventh . . . , etc., revolution, and to process the signal read by the head 112' during the second halves of the second, fifth, eighth . . . , etc., revolution of the head drum.

Under the influence of the control signal at its input 146, the processing unit 106' thus shifts its processing steps in time in such a way that those one of three subsequent half revolutions is chosen as the processing time interval that the bursts of information having the higher amplitude levels appear at its input.

During a first rotation of the head drum 114', the head 110 reads video information from the track $T_i$ on the record carrier, see FIG. 9. During the second rotation of the head drum 114', the head 112' reads video information from the track $T_{i+1}$ on the record carrier. No track is read during the third rotation of the head drum 114'. During the fourth rotation, the head 110 reads information from the track $T_{i+2}$ on the record carrier. In the fifth rotation, the head 112' reads video information from the track $T_{i+3}$. In the sixth rotation, no track is read.

Figure 13:
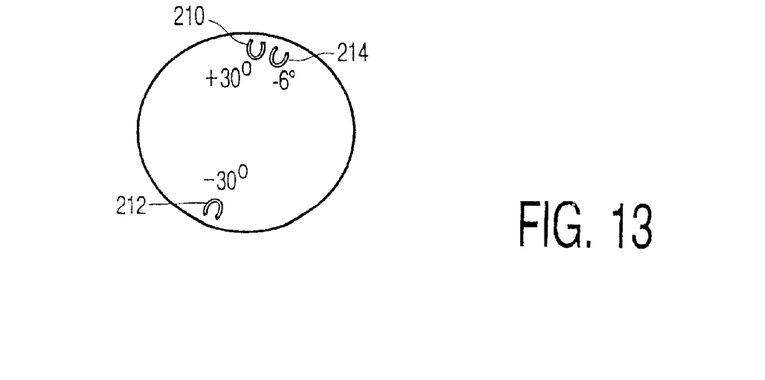
FIG. 13 shows the head drum of again another embodiment of the recording apparatus and a reproduction apparatus.

FIG. 13 shows the head drum of again another embodiment of the recording apparatus of the invention. The head drum has three heads 210, 212, and 214. The head 210 has, in the present example, an azimuth angle of 30 degrees, the head 212 has an azimuth angle of −30 degrees and the head 214 has an azimuth angle of −6 degrees. The heads 210 and 214 lie side by side and the head 214 is positioned at 180 degrees with reference to the head pair 210,214 at the circumference of the head drum.

Figure 14A:
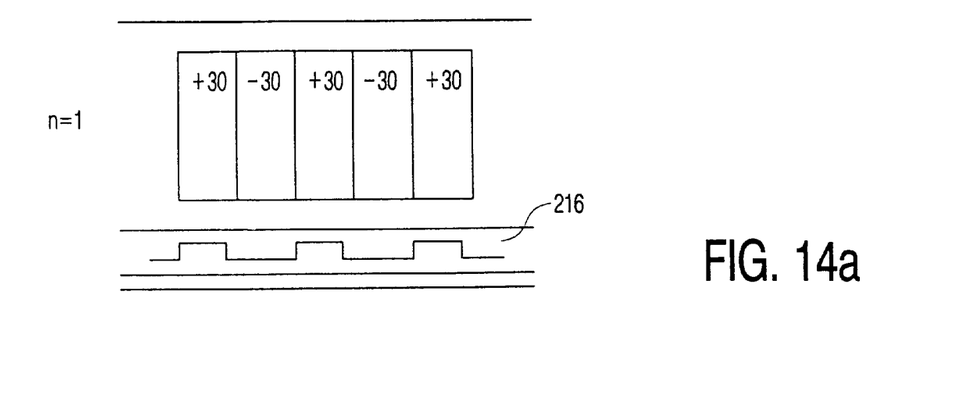
FIG. 14a shows the resulting track formats for the first recording mode.

In the first recording mode, the heads 210 and 212 record tracks of information on the record carrier. This is schematically shown in FIG. 14a. This is the well-known prior art recording mode, with the CTL signal recorded in the CTL track 216 as shown.

Figure 14B:
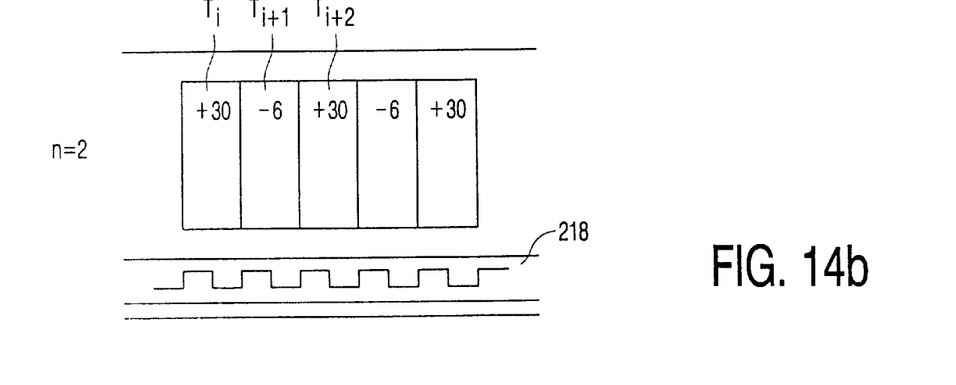
FIG. 14b shows a second recording mode of n even (n=2)

In the second recording mode, when n is even, such as n=2, the information is recorded on the record carrier using the heads 210 and 214, in the following way, and resulting in the track pattern shown in FIG. 14b. The record carrier transport speed is now $v_t/2$. During a first revolution of the head drum, the apparatus records a burst of information on the record carrier using the head 210, resulting in the track $T_i$ to be written. During the second revolution of the head drum, a burst of information is written on the record carrier using the head 214, resulting in the track $T_{i+1}$ to be written. Next, during the third revolution of the head drum, a burst of information is written by the head 210 again, resulting in the track $T_{i+2}$. Further, the CTL track 218 is the result, and giving a rising edge in the CTL signal corresponding to each track recorded.

Figure 14C:
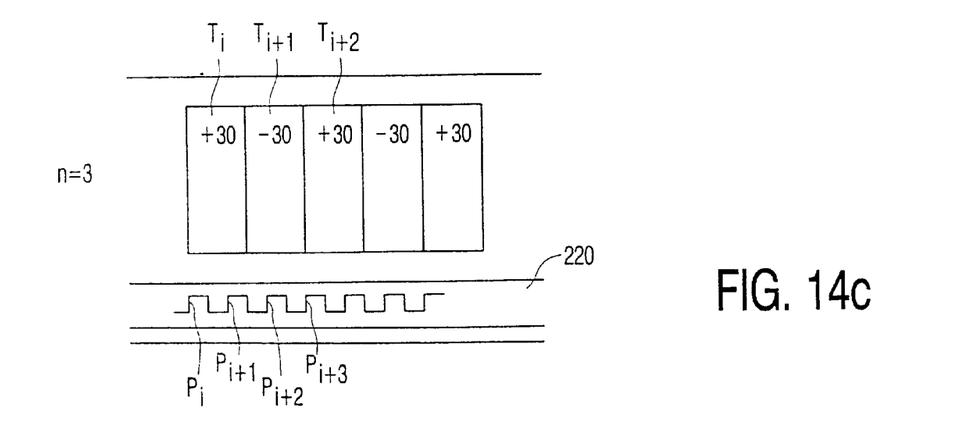
FIG. 14c shows a second recording mode for n is odd (n=3).

In again another second recording mode, when n is odd, such as n=3, the information is recorded on the record carrier using the heads 210 and 212 again, in the following way, and resulting in the track pattern shown in FIG. 14c. The record carrier transport speed is now $v_t/3$. During a first revolution of the head drum, the apparatus records a burst of information on the record carrier using the head 210, resulting in the track $T_i$ to be written. During the second revolution of the head drum, a burst of information is written on the record carrier using the head 212, resulting in the track $T_{i+1}$ to be written. Next, during the third revolution of the head drum no information is written on the record carrier. Further, in the fourth revolution of the head drum, a burst of information is written by the head 210 again, resulting in the track $T_{i+2}$. Further, the CTL track 220 is the result. In between the rising edges $p_i$ and $p_{i+3}$, that correspond to the tracks $T_i$ and $T_{i+2}$, respectively, are two further rising edges $p_{i+1}$ and $p_{i+2}$ present.

It will be clear from the foregoing description of the various embodiments, that a recording apparatus having a head drum configuration of FIG. 13 can easily be derived from the teachings given above, so that no further explanation is required. In the same way, a reproducing apparatus provided with the head drum of FIG. 13 can easily be derived, so that no further explanation is required.

While the invention has been described with reference to preferred embodiments thereof, it is to be understood that these are not limitative examples. Thus, various modifications may become apparent to those skilled in the art, without departing from the scope of the invention, as defined by the claims.

Further, the invention lies in each and every novel feature or combination of features.

What is claimed is:

1. An apparatus for recording an information signal to produce slant tracks on a magnetic record carrier, and for recording a control (CTL) signal to produce a longitudinal CTL track on said record carrier, the apparatus comprising:
   input means for receiving the information signal;
   first writing means comprising at least a first write head and a second write head located on a rotatable head drum, for writing the information signal on said record carrier thereby producing the slant tracks on the record carrier, the first write head having a gap with a first azimuth angle, and the second write head having a gap with a second azimuth angle;
   generator means for generating a CTL signal with a specific frequency, said CTL signal having first type edges and second type edges; and
   second writing means having a CTL write head for writing the CTL signal on said record carrier thereby producing said longitudinal track,
   whereby, in a first recording mode, the first writing means writes, during each revolution of the head drum, a portion of the information signal to produce the tracks of information on said record carrier, said specific frequency of said CTL signal being such that the second writing means writes one of said first type edges in said CTL signal in said CTL track during each revolution of said head drum, the apparatus further comprising:
   transport means for transporting the record carrier with a predetermined first speed in said first recording mode; and
   drive means for rotating said head drum with a predetermined rotational velocity in said first recording mode, characterized in that in a second recording mode, the first writing means writes, using said first and second write heads, a portion of said information signal to produce slant tracks of information on said record carrier during each n-th revolution of said head drum, while the transport means transports the record carrier with a second speed which substantially equals the first speed divided by n, where n is an integer larger than 1, and the drive means rotates said head drum at substantially said predetermined rotational velocity, the generator means generating said CTL signal with said predetermined frequency, and the second writing means writing the CTL signal of said predetermined frequency to produce said longitudinal track.

2. An apparatus for reproducing an information signal from slant tracks on a magnetic record carrier, the apparatus comprising:

first reading means comprising at least a first read head and a second read head located on a rotatable head drum, for reading recorded information from said record carrier;

second reading means having a control (CTL) read head for reading a CTL signal recorded in a longitudinal CTL track on said record carrier; and signal processing means for processing the recorded information read from the record carrier to form a replica of the information signal, the apparatus reproducing the information signal recorded in the tracks in one of at least a first reproduction mode and a second reproduction mode, wherein, in said first reproduction mode, the first reading means reads, during each revolution of the head drum, a portion of the recorded information from tracks on said record carrier, the apparatus further comprising:

transport means for transporting the record carrier with a predetermined first speed in said first reproduction mode; and drive means for rotating said head drum with a predetermined rotational velocity in said first recording mode, characterized in that said apparatus further comprises control means coupled to said second reading means and said transport means for controlling the transporting speed of said record carrier in dependence on said CTL signal, in that, in said second reproduction mode, the first reading means reads, during each n-th revolution of the head drum, a portion of said recorded information from a track on said record carrier, the transport means transporting the record carrier with a second speed substantially equal to the first speed divided by n, n being an integer larger than 1, and the drive means rotating said head drum at said predetermined rotational velocity, the apparatus further comprising detection means for detecting, in said second reproduction mode, the signal level of the recorded information read by said first read head during each revolution of the head drum, said detection means determining the one revolution in each group of n revolutions of the head drum producing the highest signal level of the recorded information read the first read head, and said detection means generating a control signal in response thereto, the signal processing means processing the recorded information read by said first read head during said one revolution of each group of n revolutions indicated by said control signal.

3. A method of recording an information signal on a record carrier to produce slant tracks on said magnetic record carrier, and for recording a control (CTL) signal to produce a longitudinal CTL track on said record carrier, the method comprising the steps:

receiving the information signal;

first writing the information signal on said record carrier to produce slant tracks on the record carrier using at least a first write head and second write head having respective gaps with a first azimuth angle and a second azimuth angle, respectively, said first and second write heads being located on a rotatable head drum;

generating a CTL signal with a specific frequency, said CTL signal having first type edges and second type edges; and second writing the CTL signal on said record carrier so as to produce said longitudinal track, wherein, in a first recording mode, the first writing step comprises writing, during each revolution of the head drum, a portion of the information signal to produce tracks of information during each revolution of said head drum on said record carrier, said specific frequency of said CTL signal being such that one of said first type edges in said CTL signal is written in said CTL track during each revolution of said head drum, the method further comprising the steps:

transporting the record carrier with a predetermined first speed in said first recording mode; and rotating said head drum with a predetermined rotational velocity in said first recording mode, characterized in that in a second recording mode, the first writing step comprises writing, by said first write head during each n-th revolution of the head drum, a portion of said information signal to produce slant tracks of information on said record carrier, the transporting step comprising transporting the record carrier with a second speed substantially equal to the first speed divided by n, n being an integer greater than 1, the rotating step comprising rotating step comprising rotating said head drum at substantially said predetermined rotational velocity, the generating step comprising generating said CTL signal with said predetermined frequency, and the second writing step including writing the CTL signal of said predetermined frequency to produce said longitudinal track in said second recording mode.

4. A record carrier having an information signal recorded thereon in slant tracks, the record carrier further having a longitudinal control (CTL) track in which a CTL signal has been recorded, said CTL signal having first type edges and second type edges, characterized in that the record carrier is playable in a reproduction apparatus in a reproduction mode in which the record carrier is transported with a speed equal a nominal reproduction speed divided by n, where n is an integer larger than 1, that each track having a specific azimuth angle corresponds to a corresponding first type edge in the CTL signal in said CTL track, and that n−1 further first type edges in said CTL signal are present in said CTL track between two of the first type edges in said CTL signal that correspond to two subsequent tracks having the same specific azimuth angle.

* * * * *

UNITED STATES PATENT AND TRADEMARK OFFICE
CERTIFICATE OF CORRECTION

PATENT NO. : 6,192,185 B1
DATED : February 20, 2001
INVENTOR(S) : Albert M.A. Rijckaert and Marinus A.H. Looykens It is certified that error appears in the above-identified patent and that said Letters Patent is hereby corrected as shown below:

<u>Column 12,</u>
Line 40, delete "step comprising rotating".

Signed and Sealed this

Nineteenth Day of November, 2002

*Attest:*

JAMES E. ROGAN
*Attesting Officer*     *Director of the United States Patent and Trademark Office*